June 13, 1939.  R. A. SANDBERG, ET AL  2,162,492
FRICTION BRAKE LEVER
Filed April 29, 1938
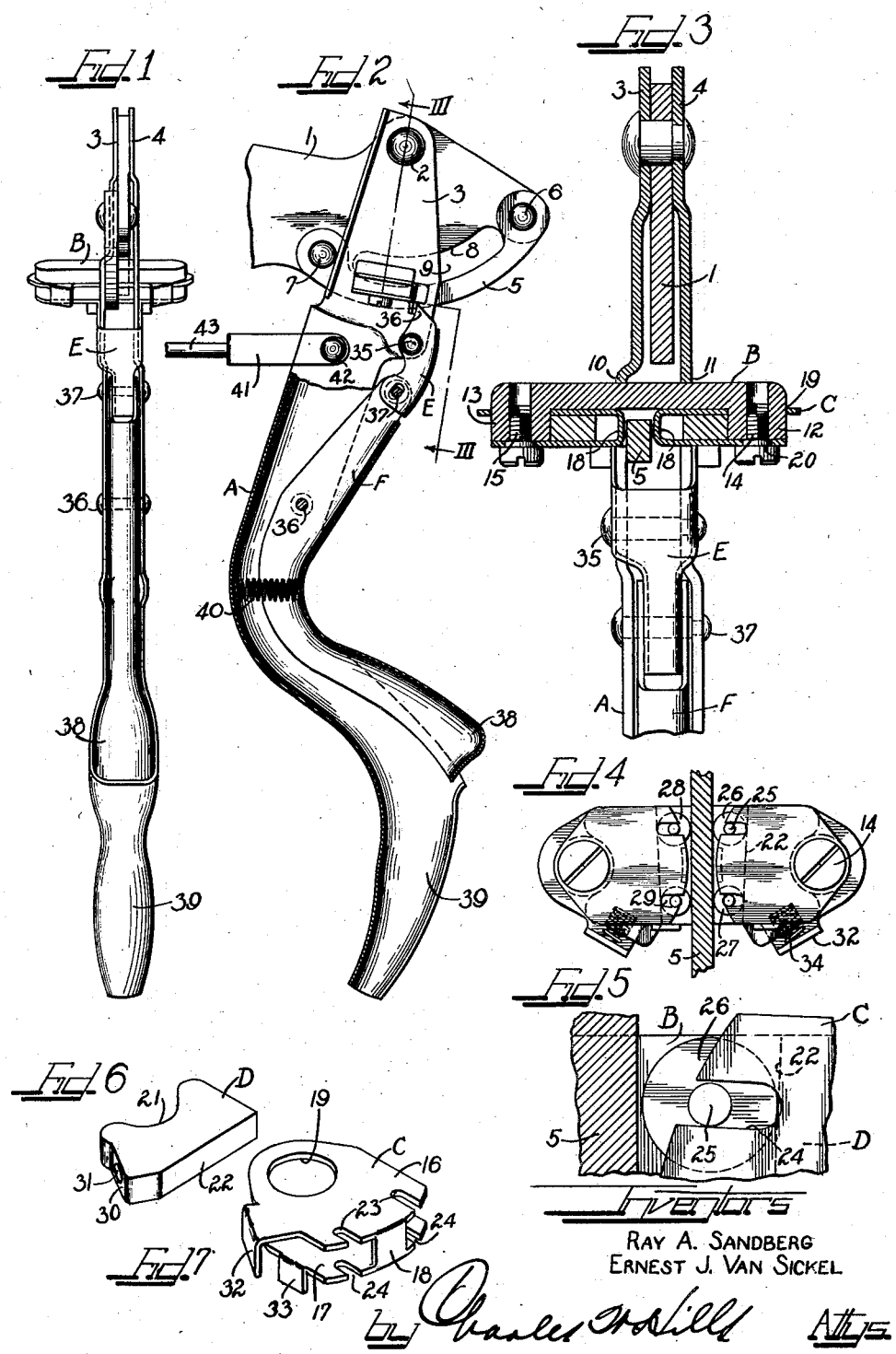
Inventors
RAY A. SANDBERG
ERNEST J. VAN SICKEL Patented June 13, 1939

2,162,492

UNITED STATES PATENT OFFICE 2,162,492

FRICTION BRAKE LEVER

Ray A. Sandberg and Ernest J. Van Sickel, Waukegan, Ill., assignors, by mesne assignments, to Houdaille-Hershey Corporation, Detroit, Mich., a corporation of Michigan Application April 29, 1938, Serial No. 204,963

11 Claims. (Cl. 74—531)

The present invention relates to a friction brake lever, and more particularly to one in which the lever is swingably mounted on a plate and in connection with which means are provided for jamming action between opposite sides of the plate and abutting surfaces carried by the lever.

An object of the present invention is to provide an efficient friction brake lever for automotive vehicles, whereby the lever may be swung in use quietly, and suitably held in adjusted position by positive frictional engagement between the mounting plate and the wedging or jamming members carried by the lever.

Another object of the present invention is to improve friction brake lever constructions for automotive vehicles.

A further object of the invention is to provide a friction type brake lever for automotive vehicles, wherein members are forced by wedge action against opposite faces of a mounting plate and urged into frictional engagement with the plate to hold the lever in adjusted position as the lever tends to swing because of brake pull.

Generally speaking, the lever construction of the present invention contemplates a flattened mounting plate, a lever having a fulcrum backward end consisting of spaced legs to straddle the plate and thereto pivoted, together with a bar extending through the lever legs and an aperture in the plate, which bar carries abutment surfaces disposed on opposite sides of the plate, together with roller means adapted to be wedged between the opposite faces of the plate and the abutment means, for frictionally securing the lever in adjusted position.

The above, other and further objects of the present invention will be apparent from the following description and accompanying drawing.

The accompanying drawing illustrates an embodiment of the present invention, and the views thereof are as follows:

Figure 1 is an edge elevational view of a lever constructed in accordance with the principles of the present invention;

Figure 2 is a view, partially in side elevation and partially central section, of the lever of the present invention, showing it in "off" position, in the normal position of the parts when the lever is frictionally engaged in holding relation with the mounting plate;

Figure 3 is an enlarged vertical sectional view taken substantially in the plane indicated by the line III—III of Figure 2;

Figure 4 is a bottom elevational view of the bar extending through the mounting plate and lever legs and showing the rollers as arranged for wedging action with opposite faces of the plate, which is shown in section;

Figure 5 is an enlarged fragmental view showing one of the rollers shifted away from wedging engagement between its abutment and one face of the mounting plate, a portion of the mounting plate being shown in section;

Figure 6 is an isometric view of one of the parts carried by the bar for serving as an abutment for the rollers;

Figure 7 is an isometric view of one of the cages oscillatably supported on the bar, within which the abutment of Figure 6 works, and which support the rollers in operative relation.

The drawing will now be explained.

A mounting plate 1, a fragmental portion of which appears in the drawing, is provided with an end to which is pivoted at 2 spaced legs 3 and 4 of a brake lever A. An arcuate piece 5 is shown as riveted at its ends as at 6 and 7 to the plate 1 in spaced relation to the arcuate margin 8 of the plate. This construction provides an arcuate recess 9 for a purpose to be later explained.

It is to be understood that the piece 5, instead of being separate, might be made as an integral part of the plate 1 by a suitable stamping operation. As shown, the arcuate piece 5 is laterally offset with respect to the plane of the plate 1, although it could be included in the plane of the plate, if desired.

The legs 3 and 4 of the fulcrum end of the lever A are apertured at 10 and 11 respectively. A bar B extends through the apertures 10 and 11 of the legs and through the arcuate recess 9 in the mounting plate. The ends of the bar B have downwardly extending legs 12 and 13 which are bored and threaded to receive bolts 14 and 15 applied to the lower ends of the apertures. Cage members C are supported on the ends of the bar B by the bolts 14 and 15.

Figure 7 illustrates one of the cages which is formed as a stamping with parallel walls 16 and 17 connected at one end by a tongue 18 of less width than the walls. Opposite the tongue 18, the walls are apertured, the wall 16 being apertured at 19 to surround the hub 12, which is the right-hand hub of the bar B, as appearing in Figures 3 and 4. The other wall 17 is apertured at 20 to receive one of the bolts for securing the cage in position against the undersurface of the bar B, as illustrated.

The cages C are applied to the bar so that the tongues 18 thereof are adjacent the arcuate piece 5 of the mounting plate 1, the tongues being spaced slightly from the faces of this piece. Within each of the cages C is an abutment member D, constructed as shown in Figure 6, with one of its margins inwardly curved at 21 to partially encompass a hub of the bar. A margin of the member D opposite the recessed margin just described, as indicated at 22, is inclined with respect to the other margin of the member, so that when in place, it will be inclined with respect to the adjacent face of the piece 5 of the mounting plate, as shown in dotted lines in Figure 4.

The cages C are formed with inwardly directed notches 23 in the wall 16, and 24 in the wall 17, to receive the axles 25 of rollers 26 and 27 carried by one of the cages by wedging against one side surface of the piece 5, and similar rollers 28 and 29 wedging against the opposite side surface of the piece 5.

The irregularly shaped end 30 of an abutment member D is bored at 31 for a purpose to be later explained. The walls 16 of the cages C have downwardly turned lips 32, while the walls 17 have downwardly turned lips 33. According to Figures 3 and 4, the cage 3 illustrated in Figure 7 is shown as applied to the right-hand end of the bar B, with the wall 16 against the undersurface of the bar B, and the wall 17 against the lower end of the hub 12 at the right-hand end of the bar. One of the abutment members D is interposed between the walls of the cage with its indentation 21 partially surrounding the hub 12 in such manner as to maintain its margin 22 inclined in a manner indicated in dotted lines in Figure 4, at the right of the piece 5.

The lips 32, as the parts are assembled, are substantially parallel to a portion of the inclined end 30 of the abutment member D. A spring 34 is entered in the hole 31 of the abutment member, being bottomed at one end in the hole and with its other end against the inner surface of the lip 32, the function of the spring tending to swing the abutment member D in the right hand assembly as viewed in Figure 4, clockwise with respect to the cage. This tendency to swing will normally maintain the inclined margin 22 of the abutment member against the rollers 26 and 27 to hold them in surface contact with the adjacent face of the piece 5.

The construction of the other end of the bar is similar to that described.

The lips 33 of the cages C are positioned to be engaged by a trip member E for releasing the frictional engagement of the lever with the piece 5 of the plate 1. The trip member E is shown as a stamping of U-shaped configuration in cross-section, pivoted to the lever A at 35 and formed with an end piece 36 in contact with the lips 33 of the cages. An actuating member F, illustrated as a stamping of U-shaped configuration in cross-section, is pivoted at 36 to the lever A and is connected to the trip member E by a pin and slot connection represented generally at 37. The lower end of the member F normally is extended at 38 to serve as a thumb rest for actuating the trip to release the lever. The thumb rest 38 is shown as adjacent the upper end of the trip portion 39 of the lever.

Spring means are utilized for normally maintaining the thumb rest 38 projected and the trip member E in the position shown in Figure 2. The spring means illustrated comprises a coil spring 40 interposed between the legs of the brake lever A and the member F, although any other suitable spring means may be utilized.

The normal positions of the abutment members D and the several rollers are shown in Figure 4, in which positions the rollers are wedged between the inclined margins 22 of the abutment members D and the adjacent faces of the piece 5 of the mounting plate 1, thus holding the lever in frictional engagement with the plate.

A clevis 41 is pivoted at 42 to the lever A, and a cable or rod connection 43 is made to the clevis 41, for connecting the brake mechanism to the lever. The pull of the lever, under strain imposed by the brake mechanism will be to the left, as viewed in Figure 2, and upwardly, as viewed in Figure 4.

As the bar tends upwardly, as viewed in Figure 4, the contact of the rollers with the surfaces of the piece 5 will tend to pull the rollers downwardly, which movement, however, is opposed by the cages C. The rollers thus wedge between the piece 5 and the inclined abutments of the abutment members D to cause frictional engagement of the rollers with the piece 5.

In view of the fact that there are two rollers on each side of the piece 5, any tendency to tilt the members D by the lower roller 27 will move the members D into tight engagement with the rollers 26. Obviously, the abutments members D cannot oscillate counter-clockwise, as viewed in Figure 4, because of the contact of the members with the rollers. By using two rollers on each side of the piece 5, frictional engagement of the rollers with the piece 5 occurs on opposite sides of a line through the centers of the bolts 14 and 15, that is to say, on opposite sides of the center line of the bar B. This arrangement tends to increase the holding engagement of the lever with the piece 5.

When it is desired to release the lever from holding engagement with the plate 1, the operator grasps the grip portion 39 of the lever and moves it slightly to the right, as viewed in Figure 2, thereupon depressing the thumb piece 38 which in turn rocks the trip member E, bringing the cages C into the position shown in Figure 5. This swinging movement of the cages will cause corresponding swinging movements of the abutment members D, thereupon moving the inclined margins 22 thereof away from the rollers, so that the frictional holding engagement of the rollers with the piece 5 is released.

As soon as the operator removes his thumb from the thumb piece 38, the spring 40 will tend to restore the normal position of the member F, which in turn will allow shift of the cages in opposite directions permitting shifting of the abutment members D to move the rollers into surface contact with the opposite faces of the piece 5 of the plate 1, and into holding engagement with such piece. The normal tendency of the spring 34 is to shift the abutment members D in such direction as to force the rollers into frictional engagement with the piece 5 and thus hold the lever in adjusted position.

It will be observed that the loose mounting of the rollers in the cages C enables shifting movements of the rollers in accordance with the shifting movements of the abutment members D. In practice, the amount of shift of the members D is very slight, as it has been found that but a very slight movement is sufficient to enable release of their frictional engagement with the piece 5, or to wedge the rollers into frictional engagement with such piece.

The invention has been described herein more or less precisely as to details, yet it is to be understood that the invention is not to be limited thereby, as changes may be made in the arrangement and proportion of parts, and equivalents may be substituted, without departing from the spirit and scope of the invention.

The invention is claimed as follows:

1. In an automotive vehicle emergency brake lever construction, a mounting plate, a lever pivoted to said plate with legs astraddle the same, rollers carried by said lever and disposed to engage opposite faces of said plate to hold the lever in adjusted position, cage members oscillatably supported on said lever for maintaining said rollers against said plate, abutment members carried by said cage members for holding said rollers against said plate, spring means acting between said cage members and said abutment members for normally maintaining said rollers in frictional engagement with said plate, and means operable for shifting the cage members to release the rollers from holding engagement with the plate.

2. In a device of the class described, in combination, a mounting plate, a lever having spaced legs astraddle said plate and thereto pivoted, a bar extending transversely through said lever legs and said plate, and rollers disposed between said bar ends and said plate for frictionally engaging opposite faces of said plate to hold said lever in adjusted position, and means carried by said lever for dislodging said rollers from engagement with said plate.

3. In a device of the class described, in combination, a fixed mounting plate, a lever pivoted to said plate to swing, a bar passing through said lever and said plate and carrying casings thereon on opposite sides of said mounting plate, oscillatable abutment members supported by said casings, rollers loosely supported by said casings and working between said abutment members and the adjacent faces of said plate, spring means acting against said casing members to normally urge them in a direction to maintain the rollers in frictional engagement between said abutment members and plate to thereby roll the rollers into tight frictional engagement with the plate as said lever tends to move in retrograde direction due to brake pull, and means carried by said lever for shifting said casings to move the rollers out of frictional engagement with said plate.

4. An automotive emergency brake lever construction including a fixed mounting plate, a lever pivoted to said plate to swing, a bar passing through said lever and plate, casings oscillatably mounted on the ends of the bar on opposite sides of said plate, said casings supporting rollers in contact with the opposite faces of said plate, abutment members shiftable within said casings and having edges in contact with said rollers, said edges being inclined with respect to the side surfaces of said plate, and spring means acting to shift said members in such direction as to wedge said rollers between said members and the opposite faces of said plate when said lever tends to retrograde movement by reason of brake pull, and release means operable for displacing said abutment members to release said rollers from wedging engagement with said plate.

5. In a device of the class described, in combination, a mounting plate having an arcuate slot in it, a lever having spaced apertured legs astraddle said plate and thereto pivoted, a bar extending through the apertures in the legs and said plate slot for supporting rollers for frictionally engaging opposite surfaces of said plate to hold said lever in adjusted position, and manually operable means for dislodging said rollers from frictional engagement with said plate.

6. In a device of the class described, in combination, a mounting plate, a lever having spaced legs astraddle said plate and thereto pivoted, means including oscillatable cages for supporting rollers for frictional engagement with opposite faces of said plate to hold said lever in adjusted position in opposition to brake pull, rollers supported by said cages, and means for shifting said cages to dislodge said rollers from holding engagement with said plate.

7. In a device of the class described, in combination, a mounting plate, a lever having spaced legs astraddle said plate and thereto pivoted, said plate being slotted, said legs being apertured, a bar extending through the leg apertures and plate slot, cage means on the ends of said bar for supporting rollers for frictionally engaging opposite faces of said plate to hold said lever in adjusted position in opposition to brake pull, rollers supported by said cage means, said bar being provided with abutments adjacent its ends for holding said rollers against said plate, spring means acting against said cages to urge them in directions to normally maintain said rollers in surface contact with the abutments and plate so that the tendency of the lever to move under brake pull will increase the holding engagement of said rollers between the plate and bar abutments to hold the lever in adjusted position, and manually operable means for urging said cages in opposite directions to release the rollers from frictional engagement with said plate.

8. In a device of the class described, in combination, a mounting plate, a lever pivoted to said plate to swing, a bar extending transversely of the lever and having legs at its ends in spaced relation to the side surfaces of said plate, a cage member on each leg adapted for oscillatable movement thereon, an abutment member within a cage having one end surface recessed and disposed against its leg as a stop and having its opposite surface uniplanar and inclined to the adjacent side surface of the plate, roller means disposed between said latter surface of said abutment member and the adjacent side surface of the plate and loosely mounted in a cage, spring means acting against said cages to swing them in such directions as to maintain said roller means in frictional engagement with said plate and said uniplanar surfaces of said abutment members to hold the lever in adjusted position, and means operable to shift said cage members to release the roller means from engagement with the plate.

9. In a device of the class described, a lever, a mounting plate to which said lever is pivoted to swing, a bar extending transversely through said lever and said plate, said bar having end portions extending generally in the direction of the length of the lever which portions are of greater length in that direction than the thickness of the intermediate portion of the bar, cage members supported on said end portions for oscillation, means constituting abutments having faces tapered with respect to said plate, roller means carried by said cage members between said plate and said tapered faces of said abutments for contacting opposite faces of said plate, spring means acting against said cage member for normally urging said rollers into frictional engagement with said plate and said abutments to hold the lever in adjusted position, and manually operable means for shifting said cages to release the rollers from holding engagement with the plate.

10. In a device of the class described, a mounting plate, a lever pivoted to said plate to swing, a bar extending transversely of said lever and having legs at its ends in spaced relation to the side surfaces of said plate, said bar being U-shaped in side-elevation with its intermediate portion extending transversely through said lever and plate and its legs extending in the direction of the length of the lever away from the pivotal connection of the lever to the plate, cage members oscillatably mounted on said legs, said cage members loosely supporting rollers for engagement with the side surfaces of the plate, abutment members within said cage members between said rollers and the bar legs and bearing against said legs as stops, spring means working between said cage members and said abutment members for normally urging said abutment members in directions to maintain said rollers in frictional holding engagement between said plate and abutments to thereby hold said lever in adjusted position, and manually operable means for shifting said cage members in a direction to release the holding engagement of the rollers with the plate.

11. In a device of the class described, in combination, a mounting plate, a lever pivoted to said plate to swing, a bar extending transversely of said lever and having legs at its ends in spaced relation to the side surfaces of said plate, a cage member on each leg adapted for oscillatory movement thereon, an abutment member within each cage having one end surface recessed and disposed against its leg as a stop and having its opposite surface uniplanar and inclined to the adjacent side surface of the plate, two rollers in each cage disposed between the plate and the cage abutment in such manner that the frictional engagement of the rollers with the plate is outside the line of centers through said bar ends, spring means acting against said abutments to swing them in such direction as to maintain said rollers in frictional engagement with said plate and thereby holding said lever in adjusted position, and means operable to shift said cages to release the rollers from frictional engagement with said plate.

RAY A. SANDBERG.
ERNEST J. VAN SICKEL.